United States Patent [19]

Chao

[11] 4,247,580
[45] Jan. 27, 1981

[54] REFINISHING OF THE SURFACES OF BODIES OF A THERMOPLASTIC RESIN

[75] Inventor: Andy P. Chao, New Westminster, Canada

[73] Assignee: Stuart Plastics Ltd., New Westminster, Canada

[21] Appl. No.: 875,243

[22] Filed: Feb. 6, 1978

[51] Int. Cl.³ .......................................... B32B 35/00
[52] U.S. Cl. ...................................... 427/140; 156/94; 156/98; 264/36; 264/83; 264/341; 427/322; 427/335; 427/398.1
[58] Field of Search .......... 427/140, 322, 335, 398 R, 427/444, 398.1; 156/94, 98; 264/83, 341, 36

[56] References Cited
U.S. PATENT DOCUMENTS

| | | | |
|---|---|---|---|
| 3,327,033 | 6/1967 | Koch et al. | 264/83 |
| 3,684,553 | 8/1972 | Van Dyk | 427/444 |
| 3,737,499 | 6/1953 | Kamena | 264/341 |
| 4,133,912 | 1/1979 | Stuart | 427/140 |

Primary Examiner—Ralph S. Kendall
Assistant Examiner—Sadie L. Childs
Attorney, Agent, or Firm—Fulwider, Patton, Rieber, Lee & Utecht

[57] ABSTRACT

A process for refinishing the surface of a body of acrylo-butadiene-styrene (ABS) polymer by applying to the surface a coating material and treating the body with a solvent. The surface is cooled, together with at least the material underlying the surface, to a temperature in the range about 32° F. to 40° F. The surface of the body is then contacted with a solvent vapor for a time sufficient to reflow the surface but not to warm appreciably the inner layer of the body. The process avoids distortion in the refinished surface.

9 Claims, 1 Drawing Figure

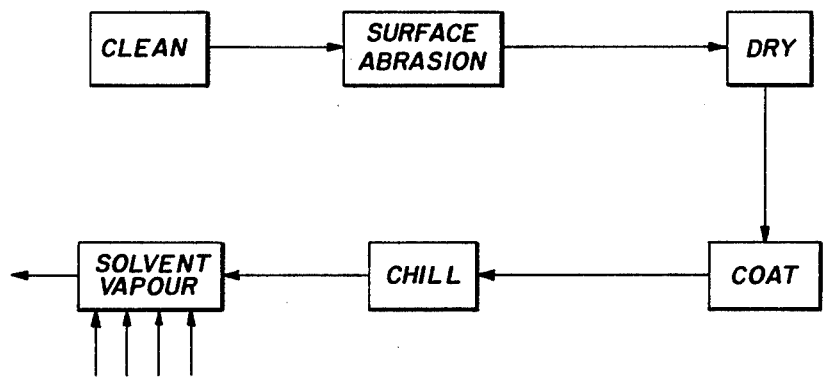

REFINISHING OF THE SURFACES OF BODIES OF A THERMOPLASTIC RESIN

FIELD OF THE INVENTION

This invention relates to the refinishing of the surfaces of bodies of acrylo-butadiene-styrene (ABS) polymer. In a preferred embodiment the invention relates to a process for refinishing the surfaces of ABS telephone sets.

DESCRIPTION OF PRIOR ART

The refinishing of used and scratched articles of thermoplastic resin is well known. It has been known for some time that a solvent treatment of the surface can remove scratches by dissolving the surface layer and then redistributing the dissolved plastic. In particular, surfaces of bodies made from acrylo-butadiene-styrene polymer have been treated in this way. The solvents used vary widely but typical solvents include organic solvent, for example, dichloroethane and trichlorotrifluoroethane. A mixture of these two solvents has also been used. Other solvents that have been used include ketones, particularly acetone and methyl ethyl ketone, chlorinated hydrocarbons, xylene, perchloroethylene and trichloroe-thylene. These solvents may be diluted with certain inert materials, for example toluene.

In addition to the above ABS resins, it is also known to refinish surfaces of acrylic resins, acetates, butyrates, polycarbonates and polystyrene by solvent treatment. Generally speaking these resins may all be treated with the same solvents. That is the solvents useful for the refinishing of the surface of a body of one resin may also be used to refinish the surface of a body of another resin.

A body of a thermoplastic resin that needs to be refinished is usually stressed in two ways. First, there are internal stresses produced in the molding of the body. These stresses are particularly pronounced, first at that part of the body that was originally close to the gate to an injection mold when the body was produced and, secondly, at those parts surrounding points in the die where the plastic material changed direction during molding or where two fronts or different columns of resin meet. In a thin-walled body the above internal stresses may stretch right through the article.

The second sort of stress is that induced by marring the surface of the body.

During the refinishing of the surface of the body by solvents, the internal stresses can cause problems. In particular, internal stresses can be released and produce undulations in the surface of the body during the solvent process.

It is also known that bodies of thermoplastic resin can be refinished by coating them, usually by spraying with a paint or lacquer. This coating method has been widely used but has a number of disadvantages. First, the paint or lacquer can chip off the refinished body. Secondly, once refinished in this way, subsequent refinishing becomes difficult and economically unattractive. It is usual to throw away a body that has been refinished by painting or lacquering once the article requires further refinishing.

Commonly assigned, copending U.S. application Ser. No. 817,204 filed July 20th, 1977, now U.S. Pat. No. 4,133,912 (Canadian application Ser. No. 257,509 filed July 21st, 1976)describes and claims a process in which the solvent refinishing of thermoplastic articles is carried out by a process that includes a cooling step prior to solvent vapor treatment. That process has achieved excellent results in most instances but is of limited use where an article is badly flawed, for example by deep scratches or indentations. For a badly flawed article the time of contact with the solvents that is required can be such that the benefits of the cooling are lost. Further, it can be that the body does not have enough wall thickness to allow material to flow to fill the flaw.

SUMMARY OF THE INVENTION

The present invention seeks to provide a method of refinishing the surface of a body of ABS polymer that does not have the above disadvantages. The invention includes a coating step in which the article is coated with ABS polymer, cooled then subjected to a solvent vapor treatment.

Accordingly the present invention is a process for refinishing the surface of a body made from acrylo-butadiene-styrene (ABS) polymer, the process comprising coating the body with a layer of ABS, cooling at least the surface of the coated body to a temperature in the range 32° F. to 40° F., that is below the temperature at which a predetermined solvent for ABS will readily dissolve or soften the surface of the ABS, then contacting the surface of the body with a solvent for a time sufficient to flow the surface but not to warm appreciably the inner layer of the body.

Desirably the whole body to be refinished is cooled.

The ABS that is coated is preferably as close as possible to the original composition of the body. It has been found that with telephone hand sets ground-up sets are ideal as a source of ABS. It is useful to use hand sets that are cracked or similarly damaged as a source of ABS, thus preventing both waste and the necessity of disposing of the sets.

The defined temperature range is not too far below a typical ambient temperature. Particularly in a moist temperature, low temperatures can cause condensation of moisture onto the surface with consequent imperfections in the refinished surface. Generally the more active the solvent in dissolving the resin the lower the temperature used.

DESCRIPTION OF THE DRAWINGS

The invention is illustrated, by way of example, in the accompanying drawing which is a schematic, block diagram illustrating a process according to the present invention.

DESCRIPTION OF PREFERRED EMBODIMENT

Upon receipt of ABS articles to be refinished in a reconditioning plant, the bodies are sorted by type, colour and condition. Only those in bad condition will generally require the treatment by the process of the present invention. Those in better condition may be treated using the process described and claimed in my above patent application, that is the coating step is not needed. As indicated above others may be beyond repair. For example cracked bodies cannot satisfactorily be repaired using the process of the present invention or the process of the above patent application.

As shown in the drawing, when a body of ABS polymer that is relatively badly damaged is to be refinished the body is first subjected to a cleaning process. Typically this can be carried out by immersing and scrubbing the body in a surface-active material, for example a synthetic detergent. After this first cleaning, which can also be used to remove pieces of paper and the like adhering to the surface, the body may be abraded to remove relatively deep scratches and imperfections in the surface. The surface abrasion may be carried out by buffing the surface, by tumbling the articles with abrasive granules, by grinding or any similar, known process.

After the surface abrasion, the articles are dried. The articles may be dried by passing through an oven or by leaving them in a warm atmosphere. After the drying they are coated. The articles are passed through a conventional coating apparatus in which a solution or dispersion of ABS is preferably sprayed on them. The ABS polymer should be as close as possible in composition to the article to be refinished. As indicated above ground hand sets have been used but, in addition, medium density ABS resin has been used. The solvents used are any that will dissolve the ABS coating material and are sufficiently volatile that their presence does not become a hindrance to the subsequent steps in the process. The solvent systems that have been used include (a) acetone with methyl ethyl ketone in equal proportions and (b) toluene. Furthermore, a mixture of acetone: methyl ethyl ketone: toluene in the proportions by volume of 1:1:2 has proved useful.

The coating composition should desirably include pigment, for example the well known commercially available inorganic pigments, that match the colour of the body to be refinished. However, in this regard, it may be pointed out that the method of the present invention is also appropriate for applying an entirely different colour with excellent results. The colours that have been used include beige, yellow, ivory, white, gray, green, red and off white. The combination of solvent, ABS and pigment is typically blended in a mechanical blender using a dispersing agent. The dispersing agent available under the trademark Araldite 507 has proved useful.

After the coating the bodies are placed in a tray, for example in the case of telephone hand sets, a tray that can hold up to twelve sets. On the tray the articles are passed into a refrigerated unit where they are chilled. Simple refrigeration systems, for example those using the halogenated hydrocarbons available under the trade mark FREON, can be used. In a typical embodiment, a tray containing twelve telephone sets was maintained in the chilling chamber for eight minutes. The temperature of the chilling chamber was 40° F. The tray was moved through the chilling chamber. The dwell time will vary with the thickness of the article. The thicker the article, the longer the dwell. However, the dwell time should be adjusted so that at least the surface of the article and the underlying layer leave the chilling chamber at the desired temperature.

After the cooling treatment the bodies are passed into a solvent vapour. A simple heated coil can be positioned in the base of a bath that also contains a relatively volatile solvent. By heating of the coil the solvent is evaporated. Desirably the trays containing the articles may be lowered into the chamber and thus the vapour of the solvent. The walls of the solvent vapour chamber should be sufficiently high so that condensation of the solvent vapours can take place and, desirably, cooling coils are positioned in the vapour to assist condensation. Furthermore, to avoid any possible pollution hazards, extraction fans and condensors should be positioned over the solvent vapour baths.

A typical dwell time for the body in the vapor is in the range 5 to 30 seconds. The time will vary with, for example, color and the percentage of ABS in the coating. Routine experiments will easily determine the appropriate time however it has been found that a white coating may need only 5 seconds but a black coating may require 20 to 30 seconds in the vapor.

With the treatment of ABS articles methylene chloride or mixtures of halogenated hydrocarbons have proved useful as the solvent vapour, however, the solvents listed above as solvents for the ABS coating composition are all relatively volatile and can be used as the solvent vapour.

The process according to the present invention and, in particular, incorporating a coating step and a chilling step into a solvent refinishing process, has provided excellent results. One passage of the article through the illustrated process has proved adequate. Surface deformation after the process has not been observed.

The process is applicable to any ABS article. Of particular significance is the fact that the coated ABS, after the process of the present invention, is indistinguishable from the ABS of the refinished body. The combination of coating the body with ABS, cooling the surface and then solvent treatment of the coated surface is an extremely effective method of producing an extra layer on the body to be refinished but the limits of the extra layer cannot be determined by, for example, cutting the refinished body apart and observing the cut surface. Even with a microscope the observation of a boundary is difficult. The refinished body, produced in the process of the present invention, is as new in that there is no apparent coating. There is merely a uniform structure throughout the cross section of the refinished body, even when the applied ABS does not correspond precisely in composition to the ABS of the body refinished. This has the great advantage that a body can be refinished any number of times using the process of the present invention.

Also of interest, particularly to telephone set manufacturers, is that the color of a set can be changed. In telephones certain colors are fashionable for a time then demand falls. As a result a manufacturer can be left with large stocks of telephones of an apparently unpopular color. These telephones can be recolored using the process of the invention.

Using the invention it is also possible to produce telephones in unpigmented ABS resin. The resin is translucent. According to demand these telephones can be colored, by the process of the present invention a fairly short time before installation. This greatly reduces stock-keeping needs.

I claim:

1. A process for applying a new finish to the surface of a body made from acrylo-butadiene-styrene (ABS) polymer, the process comprising coating the body with a layer of ABS, cooling at least the surface of the coated body to a temperature in the range about 32° F. to about 40° F. then contacting the surface of the body with a solvent vapor for a time sufficient to flow the surface but not to warm appreciably the inner layer of the body.

2. A process as claimed in claim 1 in which the whole body is cooled.

3. A process as claimed in claim 1 in which the ABS is coated with a composition comprising a solvent for the ABS, the ABS, a pigment and a dispersant for the pigment.

4. The process as claimed in claim 3 in which the solvent is a mixture of acetone, methyl ethyl ketone and toluene.

5. The process as claimed in claim 1 in which the body is a telephone set component.

6. A process as claimed in claim 5 in which the ABS used as the coating material is obtained by grinding telephone hand sets and dissolving the granular product in a solvent.

7. A process as claimed in claim 1 in which the solvent vapor is methylene chloride alone or in admixture with another halogenated hydrocarbon solvent.

8. A process as claimed in claim 1 in which the article is cured by passing air at about room temperature over it after contact with the solvent vapor.

9. A process for refinishing a telephone set of ABS polymer that comprises subjecting the body to a preliminary degreasing and cleaning;

removing minor scratches from the surface;

coating the article with a solution of ABS containing a pigment to colour the coating ABS the same colour as the hand set to be refinished;

cooling the surface of the set and at least the underlying layer to a temperature in the range 32° F. to 40° F., and subjecting the body to a treatment with the vapor of a solvent for a time sufficient to flow the coated surface but not to warm appreciably the inner layer of the body.

* * * * *